July 6, 1937.   L. T. TROLAND   2,085,877
SOUND RECORD MOTION PICTURE FILM AND PROCESS
Filed Dec. 20, 1928
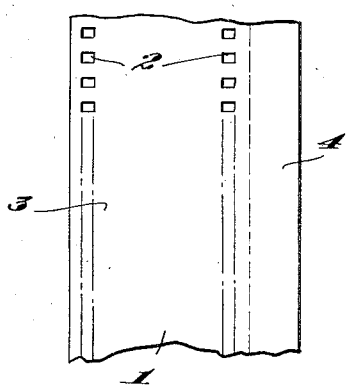
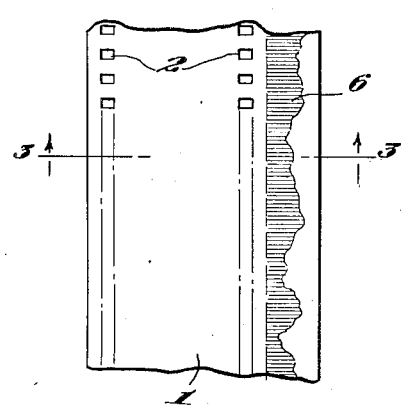
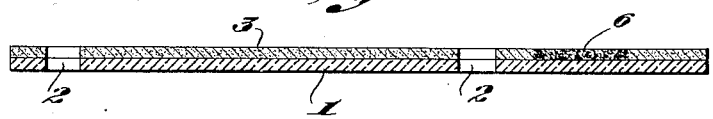
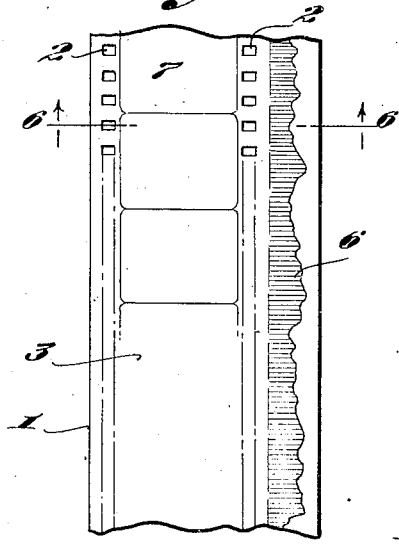
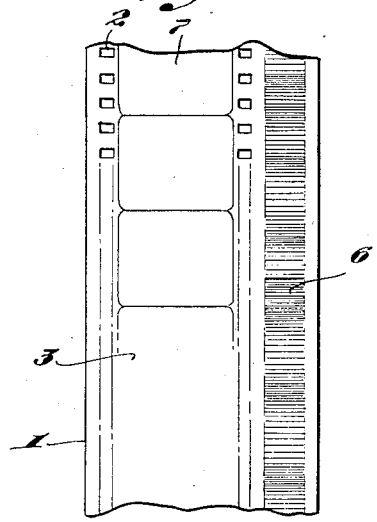
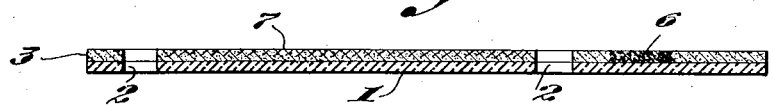
Inventor
Leonard T. Troland
by Roberts, Cashman & Woodbury
Attys.

Patented July 6, 1937

2,085,877

UNITED STATES PATENT OFFICE 2,085,877

SOUND RECORD MOTION PICTURE FILM AND PROCESS

Leonard T. Troland, Cambridge, Mass., assignor, by mesne assignments, to Technicolor, Inc., New York, N. Y., a corporation of Delaware Application December 20, 1928, Serial No. 327,419

4 Claims. (Cl. 88—16.2)

The combination of a record of acoustic vibrations with natural color pictures on cinematograph film presents difficulties, particularly if the printing be effected with a dye or dyes, chiefly due to the tendency of the color pigments to diffuse and thus damage definition, such loss of definition having the effect of destroying the higher acoustic frequencies.

Objects of the present invention are to produce cinematographic film having both pictures and sound faithfully recorded thereon, to produce such film at minimum cost consistent with accurate reproduction, and more particularly to improve the art of sound reproduction in conjunction with motion pictures in colors.

According to this invention the sound record may be produced by any well-known method such as varying a light beam in accordance with the variable sound, as for example by a variable slot, exposing a sensitized section of the film with this variable beam (the exposure being uniform in width and varying in intensity if the slot be varied in width and being uniform in intensity and varying in width if the slot be varied in length) and then developing and fixing the sound record in the usual way. The color picture record may be formed in various ways, but the imbibition method described in copending applications Serial No. 194,640 and Serial No. 194,641 which have matured into a patent to D. F. Comstock, No. 1,707,710, April 2, 1929 and into a patent to W. E. Whitney, No. 1,707,699, April 2, 1929 is particularly suitable. The sound record may occupy a narrow band of the film at one side of the pictures inside the sprocket holes but is preferably located outside one row of sprocket holes so as neither to reduce the area available for pictures nor to require sprocket hole spacing greater than usual.

A preferred order of procedure consists in making the sound record of the variable light beam in a developed silver image upon one portion of the positive motion picture film, leaving the remaining portion blank, developing the silver image, and then hardening the blank portion and printing the latter portion with dyed matrices representing the different color aspects of the object field.

In this way a motion picture film is obtained in which the pictures appear in their natural color or colors and the sound record appears in the form of a developed silver image of accurate definition and/or density corresponding to the variations in the sound-variable beam of incident light.

A typical example of the invention will be described with reference to the accompanying drawing, in which:

Fig. 1 is a view of a gelatine coated film suitable for use in accordance with the invention;

Fig. 2 is a view of the same strip with a silver image of the sound record developed thereon;

Fig. 3 is a section on line 3—3 of Fig. 2;

Fig. 4 is a view of the same strip as in Fig. 2, having a colored reproduction of the original scene produced thereon;

Fig. 5 is a view of a film as in Fig. 2 showing a silver image of the sound record produced by a light beam of variable intensity; and Fig. 6 is a section on line 6—6 of Fig. 4.

Referring to the drawing, the motion picture film 1 of Fig. 1 may be provided with the usual rows of marginal sprocket holes 2 leaving a longitudinal space 3 for the pictures and a longitudinal space 4 for the sound record. The entire surface of the film may be coated with a gelatine layer containing the usual light sensitive silver salt or, if the pictures are to be printed by imbibition, only the space 4 may contain such a light sensitive silver salt while the space 3 is coated with unsensitized gelatine or other imbibition material, that is, material upon or in which printing may be effected by imbibition.

According to the preferred mode of procedure the space 4 is first exposed to light through a negative produced as above described simultaneously with the taking of the motion pictures. The space 4 is then developed in the usual way to produce the sound record 6 in black and white. If the sound record be produced by the variable width and constant intensity method, it will appear as in Figs. 2 and 4, while if produced by the variable intensity and contact width method it will appear as shown in Fig. 5.

If the pictures are to be printed by imbibition the gelatine between the rows of sprocket holes is hardened, as by subjecting to a 5% solution of basic chrome alum, preferably after the sound record has been made. The pictures are then printed by the known imbibition procedure of effecting intimate surface contact of the portion 3 of the blank successively with the matrix films (which have been formed from the negatives exposed simultaneously with the sound record) wet with appropriate dye solutions, respectively. This results in producing the printed picture image 7. Upon drying, the natural color motion picture and black and white sound record are on the same film, ready for use in the usual types of sound reproducing and motion picture projecting apparatus.

While this invention is particularly applicable in the art of motion pictures in two or more colors simulating the natural colors of the scene depicted, it is also useful in the production of cinematographic pictures by imbibition in a single color including black.

Herein the term "natural colors" is used to connote colors approximating those of the original scene (by a process utilizing two or more colors) and "black-and-white" is intended to include neutral shades such as gray.

An outstanding advantage of the present invention consists in that records may be accurately reproduced with any good reproducing apparatus whereas good reproduction with films having the sound record (as well as the picture records) in color depends upon which of the two well-known types of sound reproducing apparatus is employed, that is, whether the active metal of the photoelectric cell is potassium or caesium. The potassium cell is most sensitive to blue light whereas the caesium cell is sensitive to both red and green. Consequently a sound track in color can not be adjusted to have the proper contrast for both cells (if it is right for one it is wrong for the other) and the film can not be used interchangeably in apparatus of the respective types with satisfactory results in both if indeed in either.

I claim:

1. The method of making motion picture films which comprises developing a sound record on a portion of a gelatine coated film, in the form of a photographic silver image, hardening the gelatine film, and printing the color images upon the hardened film by imbibition.

2. Method of making motion picture films and sound records, comprising as steps simultaneously exposing one portion of a negative film to the scenes to be depicted and another portion to a light source, variable in response to sound wave vibrations, developing a sound record from said negative film on a portion of a gelatine coated film, in the form of a photographic silver image, hardening the gelatine film, and printing the color images upon the hardened film by imbibition.

3. The method of making motion picture film bearing a concomitant sound record which comprises coating the picture and sound areas of the film with a layer of gelatine or the like, the gelatine throughout the sound area being sensitive to light, exposing the sound area to light graduated in accordance with the sound, developing the sound record, and printing the motion pictures on the picture area in a plurality of colors simulating the natural colors of the scene depicted.

4. The method of making motion picture film bearing a concomitant sound record which comprises coating the picture and sound areas of the film with a layer of gelatine or the like, the gelatine throughout the sound area being sensitive to light, exposing the sound area to light graduated in accordance with the sound, developing the sound record, and by imbibition printing the motion pictures on the picture area in a plurality of colors simulating the natural colors of the scene depicted.

LEONARD T. TROLAND.